United States Patent [19]

Shimamune et al.

[11] Patent Number: 5,746,896
[45] Date of Patent: May 5, 1998

[54] METHOD OF PRODUCING GAS DIFFUSION ELECTRODE

[75] Inventors: Takayuki Shimamune; Yasuo Nakajima, both of Tokyo; Yoshinori Nishiki; Takahiro Ashida, both of Kanagawa, all of Japan

[73] Assignee: Permelec Electrode Ltd., Kanagawa, Japan

[21] Appl. No.: 626,925

[22] Filed: Apr. 3, 1996

[30] Foreign Application Priority Data

Apr. 10, 1995 [JP] Japan ................................. 7-110160

[51] Int. Cl.⁶ .................................................. C25B 11/00
[52] U.S. Cl. ................................... 204/284; 204/290 R
[58] Field of Search ............................. 204/284, 290 R

[56] References Cited

U.S. PATENT DOCUMENTS 5,536,379   7/1996   Nonaka et al. ........................ 204/284

*Primary Examiner*—Bruce F. Bell
*Attorney, Agent, or Firm*—Sughrue, Mion, Zinn, Macpeak & Seas, PLLC

[57] ABSTRACT

A method of producing a gas diffusion electrode by forming a thin layer comprising a carbon power and a silver powder on the surface of a substrate comprising silver, copper, nickel or stainless steel and fluorinating the thin layer make the carbon water repellent.

The gas diffusion electrode can be stably used for a long period of time in sodium chloride electrolysis, etc., without clogging the passage of gas and lowering the water repellency of the electrode.

3 Claims, No Drawings

METHOD OF PRODUCING GAS DIFFUSION ELECTRODE

FIELD OF THE INVENTION

The present invention relates to a method of producing a gas diffusion electrode which can be used in a stable manner under severe conditions, and in particular, to a method of producing a gas diffusion electrode having stable operation for a long period of time even in an alkali solution wherein an oxygen gas exists, such as a sodium chloride electrolytic bath.

BACKGROUND OF THE INVENTION

A cathodic reaction in industrial electrolysis such as caustic alkali electrolysis is mainly a hydrogen generating reaction except metal winning and plating. The hydrogen generated thereby is, in some cases, effectively used but is generally wasted. It is well known that even when the hydrogen generated thereby is effectively used, a large amount of energy is used.

To reduce energy consumption, attempts have been made to use gas diffusion electrodes developed in the field of cells such as fuel cells. When such a gas diffusion electrode is applied to an energy-efficient ion-exchange membrane-type sodium chloride electrolysis (having an electrolytic voltage of about 3 volts), a reduction of the voltage of about 1 volt as a theoretical decomposition voltage from the electrode reaction may be attained. This results in a reduction of the electric power consumption of about 40%. In this respect, a real voltage reduction of from 0.9 volt to 1 volt is reported in the literature.

These gas diffusion electrodes are all in sheet form. The main material which forms the gas diffusion electrode is a carbon powder comprising mainly graphite wherein the carbon power is lumped using a fluorine resin as the binder. The gas diffusion electrode is produced by increasing the amount of the fluorine resin at one surface to achieve water repellency, reducing the amount of the fluorine resin at the opposite surface to achieve a hydrophilic property, and carrying platinum or other electrode substances on the carbon powder. Also, there are gas diffusion electrodes wherein a wire mesh is inserted in the electrode sheet and an electric current is passed through the wire mesh. There are also gas diffusion electrodes wherein a carbon fiber mesh is inserted in the sheet in place of the wire mesh, the whole assembly being integrated in a body to improve physical strength and to impart an electric conductivity to the water-repellent side of the sheet. An electric current is passed through a collector equipped separately in such electrodes.

Each of these electrodes so lumped together by heating with a carbon powder carrying an electrode substance and a fluorine resin as the binder with the lumped sheet carried on a substrate such as titanium, nickel, stainless steel, etc., may be easily produced. Moreover, a three-dimensional solid skeleton capable of becoming a strong sheet such as the so-called PTFE (polytetrafluoroethylene), etc., is not formed. Even if the crosslinking of the fluorine resin of such a gas diffusion electrode is insufficient, when the electrode is used for the depolarization of oxygen as a cathode by introducing an oxygen-containing gas, the electrode performs satisfactorily and stably from the beginning. However, since a fluorine resin is not always stable in an alkali, the water repellency of such an electrode is decreased when it is used for a long period of time. Moreover, the activity of the electrode substance may be reduced. Thus, the good performance of such gas diffusion electrodes is maintained for a short time but usually yet for more than one year.

The substrate described above is stable in an alkali for generating hydrogen, and it is used as a material for cathodes in conventional sodium chloride electrolysis. However, when the electrolysis is carried out under alkaline conditions while supplying an oxygen-containing gas, the carbon powder and nickel become chemically unstable. This is caused by it being oxidized and corroded with oxygen supplied or hydrogen peroxide formed by the reduction of oxygen according to the following equation:

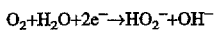

Also, hydrogen peroxide reacts with carbon, and further reacts with caustic soda to form a hydrophilic carbonate. The carbonate deposits on the surface of the gas diffusion electrode as a solid and thereby interrupts gas diffusion thereby making the gas diffusion electrode hydrophilic.

Furthermore, it is necessary to uniformly supply a gas through the gas diffusion layer to a water layer having a different pressure. Since the pressure of the water layer differs in the length direction (depth direction) of the electrolytic bath, in order to uniformly supply a gas to each portion of the water layer, it is necessary to control the pressure loss of the gas diffusion layer at each portion or to change the pressure of the oxygen-containing gas in the height direction. However, the practicality of such procedures is problematic. This is the primary reason why gas diffusion electrodes have not been industrially utilized as a large scale even though they save energy. Such electrodes have been investigated in the process of producing sodium hydroxide or caustic soda by the electrolysis of sodium chloride or in producing caustic soda and sulfuric acid by the electrolysis of Glauber's salt.

Also, the passage of an electric current to the gas diffusion electrode is not easy as compared with the passage to an ordinary porous electrode. Thus, the difficulty of passing an electric current to large-sized electrolytic baths is also one of the reasons that practical electrolysis using the gas diffusion electrode has not yet been realized.

SUMMARY OF THE INVENTION

Accordingly, an object of the present invention is to solve these problems. That is, one object is to provide a gas diffusion electrode which can be used for sodium chloride electrolysis or Glauber's salt electrolysis for a long period of time even under alkaline conditions.

Another object is to provide a method for making such an electrode.

That is, according to the present invention, there is provided a method of producing a gas diffusion electrode, which comprises the steps of forming a thin layer comprising a carbon powder and a silver powder and having perforations therein in the thickness direction on the surface of a metal substrate comprising at least one metal selected from the group consisting of silver, copper, nickel, and stainless steel, and further subjecting the thin layer to a fluorination treatment whereby the carbon in the thin layer is fluorinated and is rendered water repellent.

Since the metal substrate comprises an electrically conductive material, a uniform electric potential distribution, and a high physical strength, when the gas diffusion electrode is used in a strong alkali, strength reduction and corrosion of the substrate itself scarcely occur.

Furthermore, since the carbon in the thin layer formed on the substrate is fluorinated in a non-conventional manner and is not exposed to the surface which is brought into contact with a strong alkali, even when such a gas diffusion electrode is continuously used under the severe condition of forming caustic soda, such as a sodium chloride electrolysis, Glauber's salt electrolysis, etc., the formation of a carbonate and deterioration of the water repellency of the electrode is prevented. Hence, a more stable electrolytic operation is insured.

It is desirable that the substrate be a mesh material prepared by weaving the wire of the metal described above and since in a mesh material electrode, the gas permeation is uniformly carried out over the whole area of the electrode, the electrode, and performance is improved.

Furthermore, when prior to covering with the thin layer, the substrate is plated with silver stable to strong alkali, the corrosion resistance of the substrate becomes higher, whereby a longer, more stable operation becomes possible.

DETAILED DESCRIPTION OF THE INVENTION

The present invention is described in detail below.

A main object of the present invention is to prevent the gas diffusion layer from being clogged by the carbonate formed as a result of the electrolysis. Also, an object is to prevent the gas diffusion layer from losing water repellency by the caustic alkali as described above. To accomplish these objects, the thin layer containing silver and carbon is subjected to a fluorination treatment as described above.

First, at least one metal selected from the group consisting of silver, copper, nickel, and stainless steel with corrosion resistance at a cathodic polarization is used. It is desirable that the substrate be a network material since these materials provide uniform gas permeation throughout the whole area. The network mesh may be formed using a woven mesh formed by weaving a fine wire in a mesh form. The wire diameter of the mesh is most preferably from 0.1 to 0.3 mm.

In addition to the network material, the substrate can be made of a porous material or a felt-form material, etc. However, a porous substrate has excellent physical strength but has poor gas permeability. Also, regarding a felt-form substrate, although of weaker physical strength, a uniform electric current distribution can be attained. However, the electric resistance is high, and thus the passage of electric current from the felt cannot be expected.

The substrate formed by the metal described above may be formed on the surface of the thin layer. However, when the gas diffusion electrode is used as, for example, an oxygen cathode, even under a strong alkali of about pH 14, the potential becomes about 0.4 volt if there is no overvoltage and sometimes becomes about −0.5 volt by adding an overvoltage. However, when an appropriate catalyst is used, the voltage is 0 volt vs NHE or slightly less. Also, even in the case of corrosion resistant metals, since each metal or alloy except silver may corrode, it is preferable that the surface of other metals be previously plated with silver.

A thin layer comprising a carbon powder and a silver powder is formed on the surface of the substrate. There is no particular restriction on the forming method so long as necessary perforations are formed. The sizes of the perforations can be controlled by the particle sizes of the carbon power and the silver powder used. However, since silver itself functions as a catalyst, it is preferable for the surface area thereof to be large and it is more preferable to use black silver having a mean particle size of 1 µm or less. It is also preferred to knead the black silver with a dispersing agent such as carbon black, etc., or a binder such as a dispersion of PTFE, etc., and after sintering the kneaded mixture at a temperature of from 150° to 350° C., disperse the sintered product such that the apparent particle size is about 5 to 20 µm. Also, the silver powder may be lumped with a small amount of, for example, dextrin (which is lost by sintering) without using a binder followed by sintering at a temperature of from 300° to 600° C. to form a so-called loose sintering state. The sintered product may be ground into particles having an apparent particle size of from 5 to 20 µm.

The sintering may be carried out in air but it is preferable to carry it out in an inert gas atmosphere such as nitrogen, hydrogen, etc. In addition, the silver powder may be prepared by continuously grinding a brittle material which is easily reduced to silver, such as a metal hydride, etc., or it may be first dispersed and thereafter aggregated.

The mixing ratio of carbon and silver is desirably 90 to 60% silver and 10 to 40% carbon at the reaction layer side, and 10 to 40% silver and from 90 to 50% carbon at the gas diffusion layer side. Furthermore, PTFE is added to the mixture in an amount of 30% at the reaction layer side and in an amount of 50% at the gas diffusion layer side. Each mixture is kneaded to prepare a paste. The pastes are coated on the reaction layer side and the gas diffusion layer side, respectively, of the substrate. They are heated or sintered for about 10 minutes at a temperature of from 130° to 300° C. by a hot press to provide the substrate having the thin layer and having increased strength.

Then, by applying a fluorination treatment to the substrate, a gas diffusion electrode is prepared. The fluorination is applied for fluorinating at least the surface of the carbon present in the thin layer in order to prevent carbon from reacting with an alkali, etc., to make the electrode brittle, and to prevent the perforations of the gas diffusion layer from being clogged by the deposition of a carbonate. The fluorination is carried out by placing the substrate in a fluorine gas atmosphere, and if necessary, heating it in a conventional manner.

The fluorination treatment reduces the pressure reliance of the liquid side. This is caused by the increase of the surface tension at the reaction layer side imparting water repellency. By the reduction of the pressure reliance, when the difference in the water level is about several tens of cm, the fluctuation by gas diffusion of the height of the liquid becomes negligible.

The overvoltage of the oxygen depolarization at a current density of 30 A/dm$^2$ and a temperature of 80° C. in an aqueous 32% caustic soda solution is 550 mV. This is about 100 mV higher than the overvoltage of a conventional gas diffusion electrode by an initial value, and this characteristic results from the water repellency.

As described above, the gas diffusion electrode produced according to the present invention can be used as a cathode for a zero gap-type electrolytic bath wherein the cathode is closely contacted with a cation-exchange membrane, such as, a sodium chloride electrolytic bath or Glauber's salt electrolytic bath.

When electrolysis is operated under such a condition, the reaction site of the gas diffusion electrode becomes an interface with the cation-exchange membrane. Thus the liquid phase is very thin, whereby pressure in the height direction is not applied. Thus, it is not necessary to diffuse a gas in a liquid, and the gas diffusion layer and the reaction layer are unified.

Furthermore, it is necessary to remove caustic soda formed by the reaction layer of the gas diffusion electrode and accompanying water to the opposite side through the gas diffusion electrode. In the instant invention, perforations are formed in the thin layer and the perforations are not clogged with carbonate, etc. Thus, the caustic soda, etc., are easily removed from the perforations. In addition, in the electrolysis by a zero gap system, the necessary pressure of the oxygen-containing gas may be slight and, usually, about 20 cmAq is sufficient.

Moreover, since the carbon contained in the thin layer is fluorinated, and the surface thereof is not substantially exposed, even when hydrogen peroxide is formed by the cathodic reaction, the electrode is scarcely consumed by hydrogen peroxide. Hence, the stable electrolysis can be operated for a long period of time.

Examples of the production of the gas diffusion electrode by the methods of the present invention and electrolytic methods using the electrode are described below but the invention is not limited by these examples. Unless otherwise indicated herein, all parts, percents, ratios and the like are by weight.

EXAMPLE 1

Thickening silver plating of about 30 μm in thickness was applied on the surface of a mesh having openings of 1 mm prepared by weaving a copper wire having a diameter of 0.2 mm to obtain a substrate.

A commercially available atomized silver powder was kneaded with 1/10 by volume ratio of graphite and a small amount of an aqueous dextrin solution. The kneaded mixture was heated for 30 minutes at 400° C. while streaming a small amount of hydrogen gas. The lump thus formed was ground in a porcelain crucible.

A carbon black powder was added to the ground product in the crucible such that the amount of carbon black became 20 to 80 of silver by volume ratio followed by mixing. 20 by volume ratio of a PTFE dispersion made by Daikin Industries, Ltd. was mixed with the resulting mixture to prepare a paste. The paste was coated on one surface of the substrate described above as a reaction layer.

In the same manner as above, a carbon black powder was added to a ground silver lump such that the content of carbon black became 70 to 30 of silver by volume ratio followed by mixing. The same amount of the PTFE dispersion as described above was added to the mixture to prepare a paste, and the paste was coated on the opposite surface of the substrate as a gas diffusion layer. Each coated thickness was 0.3 mm and the total thickness became 0.7 mm.

The substrate thus coated was hot-pressed for 15 minutes at 250° C. to obtain a mesh-containing sheet having a thickness of 0.5 mm.

The sheet was placed in an inert gas atmosphere containing a fluorine gas, and carbon black was fluorinated. The apparent contact angle after fluorination was 100° at the reaction layer side and 120° at the gas diffusion layer side.

The sheet was incorporated in a sodium chloride electrolytic bath using a cation-exchange membrane (Nafion, trade name, made by E.I. du Pont de Nemours and Company) as a diaphragm directing the reaction layer surface toward the catholyte side. Also, as the anode, an inert metal electrode prepared by covering a titanium mesh with a ruthenium oxide electrode substance was disposed in the electrolytic bath closely contacting the ion-exchange membrane.

In the anode chamber 200 g/liter of a saturated aqueous sodium chloride solution was supplied, and in the cathode chamber an aqueous 32% by weight caustic soda (sodium hydroxide) solution was supplied. Furthermore, oxygen-rich air comprising 93% oxygen and 7% nitrogen produced by a PSA (Pressure Swing Adsorption) method was supplied as a cathode gas. The amount of oxygen was adjusted to become 1.5 times the theoretical value, and the pressure was adjusted to be 100 cm as a water head pressure.

When the electrolysis was carried out at a temperature of 80° C. and a current density of 30 A/dm$^2$, the current efficiency was 94%, the bath voltage was 2.35 volts, and the cathodic overvoltage in this case was 450 mV. After 1,000 hours, the bath voltage was increased by about 50 mV, but other changes did not occur and the electrolysis could be stably carried out for a long period of time.

EXAMPLE 2

A mesh having openings of 1.3 mm and composed of a silver wire having a diameter of 0.3 mm was used as the substrate.

A commercially available silver powder produced by an atomizing method was mixed with a silver powder of 200 mesh and was burned in a hydrogen gas atmosphere at 600° C. When the burned mixture was ground, a silver powder having a particle size of from 10 to 50 μm having attached to the surfaces thereof the atomized silver powder was obtained.

The silver powder was mixed with a carbon black powder having from 100 to 350 mesh such that the mixing ratio thereof became 90:10 by volume ratio, 20% by volume ratio of a PTFE dispersion was added to the mixture followed by kneading to form a paste, and the paste was coated on one surface of the substrate at a thickness of 0.3 mm.

The substrate was burned for 10 minutes at a pressure of 100 g/cm$^2$ and further subjected to a fluorination treatment as in Example 1 to obtain a gas diffusion electrode.

The gas diffusion electrode was disposed in a sodium chloride electrolytic bath using a cation-exchange membrane (Nafion, trade name, made by E.I. Du Pont de Nemours and Company) as a diaphragm such that the reaction layer surface was closely contacted with the cation-exchange membrane and the anodic side was the same as in Example 1. In the example, the cathode chamber was also used as a gas chamber and a drain for removing caustic soda formed was equipped.

The electrolysis was carried out while supplying a mixed gas of steam and oxygen of 1:1 (by molar ratio) to the cathode chamber side such that the amount of oxygen became 1.2 times the theoretical amount of oxygen and the water head pressure became 20 cm.

When the electrolysis was carried out at a temperature of 80° C. and a current density of 30 A/dm$^2$, an aqueous caustic soda solution having a concentration of 34% was obtained from the cathode chamber side. The bath voltage was 2.30 volts, the current density was 93%, and the cathodic overvoltage was from 650 to 700 mV.

The reason that the current density is low is that the water supplying amount in the gas is insufficient. In addition, after continuing the operation for 1,000 hours, little change in these values occurred.

Comparative Example 1

A gas diffusion electrode was prepared by following the same procedure as in Example 1 except that a mesh having an opening of 1 mm prepared by weaving a steel wire was used in place of the mesh prepared by a copper wire plated with silver.

When gas diffusion was evaluated under the same conditions as in Example 1, the initial current efficiency was 94%, the initial bath voltage was 2.40 volts, and the cathodic overvoltage was 450 mV. These were almost the same as those of the gas diffusion electrode as in Example 1. However, after 500 hours, the bath voltage became 2.6 volts. Also, after 500 hours, the cathodic overvoltage became 500 mV, and the increase of the cathodic overvoltage was 50 mV. However, slight coloring which, considered to be caused by the dissolution of the mesh, was observed, and the gas diffusion electrode became hydrophilic. This occurred because the mesh was dissolved, and the deterioration of performance by attaching the dissolved matters onto the surface of the gas diffusion electrode.

Comparative Example 2

A gas diffusion electrode was prepared by following the same procedure as in Example 1 except that no treatment with a fluorine gas was performed.

When the gas diffusion electrode was evaluated under the same conditions as in Example 1, the initial current efficiency was 95%, the initial bath voltage was 2.40 volts, and the cathodic overvoltage in this case was 450 mV. However, after 500 hours, the bath voltage became 2.65 volts, the cathodic overvoltage became 550 mV, and leakage of caustic soda occurred at the gas supplying side. When the leaked amount of caustic soda was ignored, the current efficiency was about 91%, which showed that several percents caustic soda was leaked into the gas chamber side.

While the invention has been described in detail and with reference to specific embodiments thereof, it will be apparent to one skilled in the art that various changes and modifications can be made therein without departing from the spirit and scope thereof.

What is claimed is:

1. A method of producing a gas diffusion electrode, comprising the steps of:

i) forming a thin layer having a surface comprising a carbon powder and a silver powder and having perforations in the thickness direction on the surface of a metal substrate comprising at least one metal selected from the group consisting of silver, copper, nickel, and stainless steel, and ii) fluorinating at least the surface of the thin layer until the carbon in the thin layer is rendered water repellent.

2. The method of producing a gas diffusion electrode of claim 1, wherein the metal substrate is a mesh material.

3. The method of producing a gas diffusion electrode of claim 1, wherein the metal substrate comprises at least one metal selected from the group consisting of copper, nickel, and stainless steel or an alloy thereof and wherein the surface of the substrate is plated with silver.

* * * * *